United States Patent [19]

Perez et al.

[11] 4,255,772
[45] Mar. 10, 1981

[54] READ/WRITE MAGNETIC HEAD ASSEMBLY WITH MAGNETORESISTIVE SENSOR

[75] Inventors: Henry S. Perez, San Jose; Theodore A. Schwarz, Saratoga, both of Calif.

[73] Assignee: International Business Machines Corporation, Armonk, N.Y.

[21] Appl. No.: 53,165

[22] Filed: Jun. 29, 1979

[51] Int. Cl.³ ........................... G11B 5/12; G11B 5/30
[52] U.S. Cl. .................................................... 360/113
[58] Field of Search ........................................ 360/113

[56] References Cited

U.S. PATENT DOCUMENTS

| 3,823,416 | 7/1974 | Warner | 360/103 |
| 3,887,945 | 6/1975 | Nepela et al. | 360/113 |
| 3,908,194 | 9/1975 | Romankiw | 360/113 |
| 3,975,772 | 8/1976 | Lin | 360/113 |

OTHER PUBLICATIONS

Smith, "Mr. Mag Head", IBM Tech. Disc. Bull., vol. 18, No. 1, Jun. 1975, p. 24.
Brock et al., "Mr. R/W Head", IBM Tech. Disc. Bull., vol. 15, No. 4, Sep. 1972, p. 1206.

Primary Examiner—Robert S. Tupper
Attorney, Agent, or Firm—Nathan N. Kallman

[57] ABSTRACT

A thin film magnetic head assembly incorporates a nonconductive magnetic substrate which serves as a first pole piece and a thin film magnetic layer for the second pole piece. A magnetoresistive (MR) element is disposed between the pole pieces. During the write mode, the MR element serves as a partial write turn to enhance the write signal current applied to a conductor means. During the read mode, the conductor means serves as a magnetic shield, and the transducing gap is effectively narrowed.

12 Claims, 6 Drawing Figures

READ/WRITE MAGNETIC HEAD ASSEMBLY WITH MAGNETORESISTIVE SENSOR

TECHNICAL FIELD

This invention relates to read/write magnetic head assemblies employing magnetoresistive (MR) sensing elements.

An object of this invention is to provide an improved read/write magnetic head assembly that writes wide and reads narrow.

Another object of this invention is to provide a simplified read/write magnetic head assembly which affords relatively high write current densities with reduced write currents.

Another object is to provide a read/write magnetic head assembly which effectively provides cancellation of external fringing fields in the read mode.

BACKGROUND ART

Some types of prior art magnetic heads employ a combination of inductive write elements and MR sensing elements for reading recorded data. For example, U.S. Pat. No. 3,887,945 and IBM Technical Disclosure Bulletin, Vol. 15, No. 4, September 1972, pp. 1206-1207, disclose read/write head assemblies which include MR elements as the sensors for reading recorded data. The types of problems that are encountered with structures, such as disclosed in the patent and the publication, are the lack of shielding from external fringing fields, and alignment problems between the MR element and the magnetic pole pieces during construction. In those magnetic heads where read and write elements are used, and in those heads where a multiplicity of transducers are joined in a common assembly, it is necessary to provide suitable shielding elements to minimize signal crosstalk and interference. This adds to the expense of production and may reduce the ultimate yield.

SUMMARY OF THE INVENTION

A read/write magnetic head assembly having a single transducing gap is formed with a magnetoresistive (MR) element encompassed by a nonconductive magnetic substrate which serves as a first pole piece, and a thin magnetic film which acts as the second pole piece. During the read mode, a bias current conductor means provides shielding from spurious external fields, and reduces the effective transducing gap resulting in a narrow read structure. During the write mode, the MR element operates in conjunction with the conductor means as a write turn to improve the write bias current, thereby allowing a reduction in write current supplied to the conductor.

BRIEF DESCRIPTION OF THE DRAWING

The invention will be described in greater detail with reference to the drawings in which.

Similar numerals refer to similar elements throughout the drawing.

DISCLOSURE OF THE INVENTION

Figure 1:
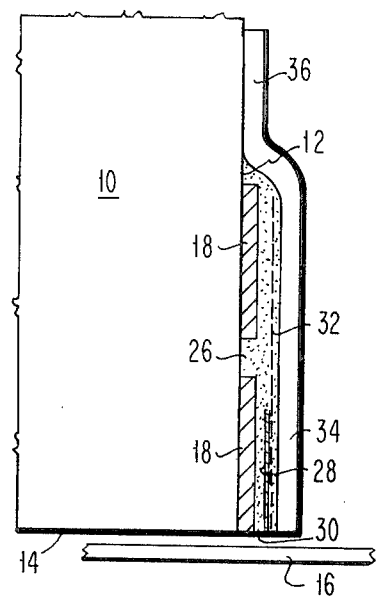
FIG. 1 is a side view, partly broken away, of a magnetic head assembly, made in accordance with this invention.
Figure 2:
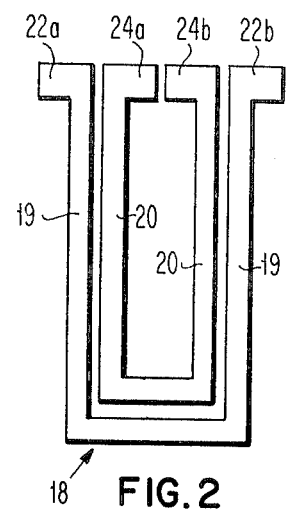
FIG. 2 is a front plan view of the conductor turns, forming part of the novel head assembly of FIG. 1.
Figure 4:
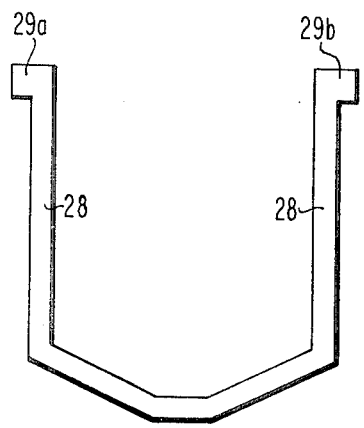
FIG. 4 is a front plan view of the MR sensor which forms part of the head assembly of FIG. 1.
Figure 3:
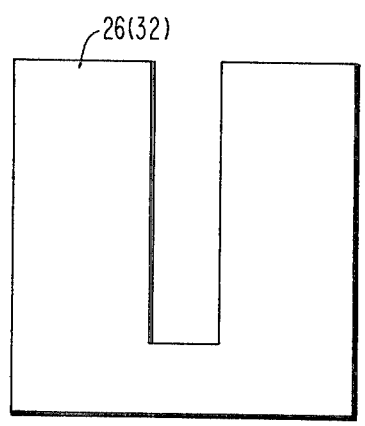
FIG. 3 is a front plan view of the insulation layer used with the head assembly of FIG. 1.
Figure 5:
FIG. 5 is a front plan view of the pole piece used to close the magnetic circuit of the head assembly of FIG. 1.
Figure 6:
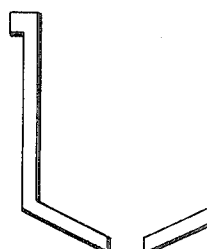
FIG. 6 is a front plan view of the conductor layer which defines the read track width.

With reference to the drawing, a magnetic head assembly includes a nonconductive magnetic substrate 10, made of ferrite for example, which has been processed to a very smooth surface finish. The ferrite substrate serves as the first pole piece of the magnetic circuit of the head assembly. The substrate includes a supporting surface 12, which is orthogonal to an air bearing surface 14 of the substrate which interfaces with a moving record medium, such as a magnetic tape 16.

In keeping with this invention, a conductor means 18 preferably having a plurality of turns, is deposited onto the supporting surface 12. In a preferred embodiment, there are two turns, the outer turn 19 being made of a magnetically soft material such as Permalloy (NiFe), whereas the inner turn 20 is formed from a nonmagnetic material, such as gold or copper. Each of the turns 19 and 20 respectively has electrical contacts or studs 22a, 22b and 24a, 24b for connection to a control circuit (not shown) which provides write current during the write mode. After the conductive turns 19, 20 have been deposited, a layer of insulating material 26, such as alumina, is laid down over the conductive turns 19 and 20.

A read sensor 28 consisting of a magnetoresistive (MR) element, made of Permalloy, is formed over a portion of the insulating layer 26. The read sensor 28 may be formed as a single Permalloy stripe, or with layers of Permalloy and a resistive nonmagnetic material, such as titanium. The MR sensor 28 includes contacts or studs 29a, 29b for connection to a readout circuit (not shown). The height of the MR element is reduced, since the effective part of the MR element is the end portion located adjacent to the air bearing surface 14. The MR element is disposed within the transducing gap 30 of the head assembly.

A second insulating layer 32 of the same pattern as the first insulating layer 26 is laid down over the MR element and onto the exposed portion of the first insulating layer. At this point, a second pole piece 34 made of Permalloy is deposited to form the back gap closure 36 with the first pole piece 10. In this way the magnetic circuit is completed with the transducing gap 30 located at the air bearing surface 14 for effective transducing operation with a record medium.

During the read mode operation of the magnetic head assembly of this invention, a relatively low current is provided to the lower Permalloy conductor means 19 which serves as a magnetic shield. The shielding action of the conductor 19 shunts away spurious fringing magnetic flux and external fields from adjacent data transitions which tend to reduce the readout data signal and thus improves signal resolution. Also, the transducing gap is effectively reduced to the distance between the second pole piece 34 and the conductor means 19, so that the head assembly reads a narrowed gap for high resolution, which was written with a relatively wide gap for write efficiency. The conductor 19 acts as a bias element for the MR sensor and serves as a pole piece and as part of the magnetic circuit during the read mode. The read track width is defined by the MR sensor 28 and the low resistance conductor overlay 35. This allows for a write wide, read narrow configuration.

During the write mode, the conductor means 19 receives write current and is not part of the magnetic circuit, which includes the ferrite substrate 10 and Permalloy thin film pole piece 34. The length of the effective write gap is defined by the substrate 10 and pole piece 34, so that the recorded data is written with a relatively wide gap. The conductive Permalloy turn 19 acts as a write turn and enhances the write signal, because Permalloy can carry a much higher density current than a copper turn, for example. Therefore, a smaller cross-sectional area for the write turn 19 is needed and relatively less write current is required than with previous structures to realize an output signal of similar amplitude.

Furthermore, during the write mode, the MR element 28 acts as a partial write turn in conjunction with the Permalloy write turn 19 thereby enhancing the write signal, and reducing the load in the turn 19.

In an implementation of a magnetic head assembly, made in accordance with this invention, the thicknesses of the elements and layers may be approximately 0.25 inch for the ferrite substrate; about 0.75 to 1 micron for the conductive turns; 0.35 to 0.5 micron for the insulators; 300 to 400 Angstroms for the MR element; and 1 to 2 microns for the second Permalloy pole piece. In such case, the read transducing gap would have a length of 0.75 to 1 micron, and the height of the MR element would be in the range of 7–15 microns.

The write transducing gap would have a length of 1.5 to 2 microns.

What is claimed is:

1. A thin film magnetic head assembly for recording and reading data comprising:
    a magnetic substrate for serving as a first pole piece, said substrate having an air bearing surface;
    a magnetically soft conductor means for providing magnetic shielding disposed on a second surface of said substrate, a portion of said conductor means being at said air bearing surface, said second surface being substantially orthogonal to said air bearing surface:
    a second pole piece located in juxtaposition to said substrate to form a magnetic circuit with said first pole piece;
    a magnetoresistive element disposed between said conductor means and said second pole piece;
    a first insulating layer disposed between said conductor means and said magnetoresistive element;
    a second insulating layer disposed between said magnetoresistive element and said second pole piece,
    so that a write transducing gap is formed between said substrate and said second pole piece, and a read transducing gap is effectively formed between said conductor means and said second pole piece.

2. A thin film magnetic head assembly as in claim 1, wherein said first pole piece is made of nonconductive ferrite and said second pole piece is made of thin film Permalloy.

3. A thin film magnetic head assembly as in claim 1, wherein said conductor means comprises outer and inner turns of conductive material.

4. A thin film magnetic head assembly as in claim 3, wherein said outer turn is made of Permalloy and said inner turn is made of copper or gold.

5. A thin film magnetic head assembly as in claim 3, wherein said outer turn has a portion that is coincident with said air bearing surface.

6. A thin film magnetic head assembly as in claim 1, wherein said head assembly includes a transducing gap, and said magnetoresistive element is located within said gap.

7. A thin film magnetic head assembly as in claim 6, wherein said magnetoresistive element, said pole pieces and said conductor means have end portions that are disposed in a common plane at said air bearing surface.

8. A thin film magnetic head assembly as in claim 1, wherein said magnetoresistive element serves as a write turn during the data write mode.

9. A thin film magnetic head assembly as in claim 1, wherein said conductor means serves as a shield during the read mode.

10. A thin film magnetic head assembly as in claim 1, wherein said magnetoresistive element comprises layers of Permalloy and titanium.

11. A magnetic head assembly as in claim 1, wherein a wide recording gap and a narrow reproduce gap are coincident.

12. A magnetic head assembly as in claim 1, wherein said head defines a wide recording track width and a narrower reproduce track width.

* * * * *